United States Patent [19]

Rocca et al.

[11] 4,445,008
[45] Apr. 24, 1984

[54] SNAP-TOGETHER HOUSING

[75] Inventors: Cosmo M. D. Rocca, Jackson; Daniel W. Tyler, Middletown, both of N.J.

[73] Assignee: Bell Telephone Laboratories, Incorporated, Murray Hill, N.J.

[21] Appl. No.: 312,520

[22] Filed: Oct. 19, 1981

[51] Int. Cl.³ .......................................... H04M 1/02
[52] U.S. Cl. ................................ 179/179; 174/52 R; 179/100 D; 312/322
[58] Field of Search ........... 179/100 R, 100 D, 100 C, 179/100 L, 103, 178, 179; 455/349; 312/204, 239, 322, 7.1, 12, 111, 140; 174/52 R

[56] References Cited

U.S. PATENT DOCUMENTS

| | | | |
|---|---|---|---|
| 2,473,775 | 6/1949 | Allen et al. | 179/100 D |
| 2,720,332 | 10/1955 | Holt | 179/103 |
| 3,239,093 | 3/1966 | Gath | 179/179 |
| 3,393,278 | 7/1968 | Gerosa et al. | 179/100 R |
| 3,480,743 | 11/1969 | Engh et al. | 179/100 D |
| 3,617,658 | 11/1971 | Grüger et al. | 179/179 |
| 3,634,599 | 1/1972 | Kliewer | 174/52 R |
| 3,657,487 | 4/1972 | Schwanck et al. | 179/100 R |
| 3,881,071 | 4/1975 | Willis et al. | 179/179 |
| 3,941,951 | 3/1976 | Engstrom et al. | 179/179 |
| 3,955,054 | 5/1976 | Hemming et al. | 179/100 D |

FOREIGN PATENT DOCUMENTS 1125011  3/1966  United Kingdom ............ 179/100 R

Primary Examiner—A. D. Pellinen
Assistant Examiner—Randall P. Myers
Attorney, Agent, or Firm—David H. Tannenbaum

[57] ABSTRACT

A snap-together housing is disclosed having a single fastener holding the multi-part housing together. The housing has a base, around which upper and lower panels fit in a clamshell arrangement. The wrap-around panels provide design contours and are the color bearing elements of the housing. Easy installation is achieved by a tab positioned at the rear of the lower panel which allows the lower panel to rotate upward around the base. A tab on the inner front surface of the lower panel engages a detent on the front of the base thereby preventing the lower panel from rotating downward without first being laterally separated from the base. The upper panel, held in position by a single fastener, interlocks with the front surface of the lower panel to prevent the lateral separation.

4 Claims, 4 Drawing Figures

SNAP-TOGETHER HOUSING

BACKGROUND OF THE INVENTION

This invention relates to a telephone housing and, more particularly, to such a housing having an easily changeable outer shell.

Often it is necessary to change the color or the design contours of a communication housing. In practice this has been accomplished in the past by unplugging the telephone and substituting a new telephone or other communication device for the removed device. From a cost point of view, such an arrangement is undesirable.

One arrangement for accomplishing the desired result would be to design the housing cover in such a manner that it could be removed easily. However, following this approach, problems exist in several areas. As a first instance, many people approach the idea of removing the cover of a sophisticated electronic device with a great amount of trepidation. These folks either are not familiar with mechanical apparatus or do not wish to be bothered with complex instructions which are susceptible to misunderstandings and improper assembly. Thus, it is desired to provide an electronic communication housing having an easily replaceable outer cover.

Compounding the problem is the fact that many of the newly designed housings have wrap around styling and thus are not susceptible to the type of assembly where an upper section is fastened to a lower base. In these designs, it is necessary to provide an arrangement which allows a person who may not possess a high degree of expertise in construction techniques and who may not possess a high degree of manual dexterity to nonetheless disassemble and assemble a multiport housing. Such a person, for example, could find it difficult to assemble a multiport housing if two of the parts had to be positioned together and held in place while a third locking part was installed. This operation becomes even more difficult for the novice who must follow instructions while balancing the various parts.

Thus it is desired to design a communication housing having the capability of easy changeability with respect to its color and design contours while also being structurally sound and not susceptible to easy accidental separation.

SUMMARY OF THE INVENTION

We have solved these and other problems by using a two part outer shell which is assembled around an inner basic housing. Our arrangement makes it possible to present to a viewer the image of a complete wrap-around housing while still being able to easily change the appearance of the housing shell.

The problem of simple assembly has been solved by the realization that the lower section may be assembled to the basic housing which allows those two parts to become temporarily interlocked with each other before the top section is applied. This interlocking is accomplished by arranging the lower section with a rear projecting tab which mates with a slot in the bottom of the basic housing. The tab is then inserted within the slot and the lower section is rotated upward. A protrusion on the inner front surface of the lower section mates with a ledge on the basic housing to prevent the lower section from rotating downward when pressure is removed. When the two parts are snapped together they form a unit which will not separate unless the lower section is actually pulled forward and away from the housing. Thus, a person who is assembling the unit need not worry about the parts separating prematurely.

Once the lower section is positioned, the upper section is then placed over the assembled unit. The upper section has a lip on its lower front edge which serves to prevent the lower section from moving forward with respect to the basic housing. The upper section then is secured to the basic housing by a fastener which may be concealed behind a face plate. The upper and lower sections form a shell, and once this shell is in position, the unit becomes securely interlocked and can withstand typical falls without separating.

Using this method of construction, a person with minimal skill and prior experience can easily assemble or disassemble the outer shell of a communication housing thereby allowing that person to quickly change the style or color of the communication device.

BRIEF DESCRIPTION OF THE DRAWING

The operation and construction of our invention can be seen from a review of the drawing in which.

DETAILED DESCRIPTION

Figure 1:
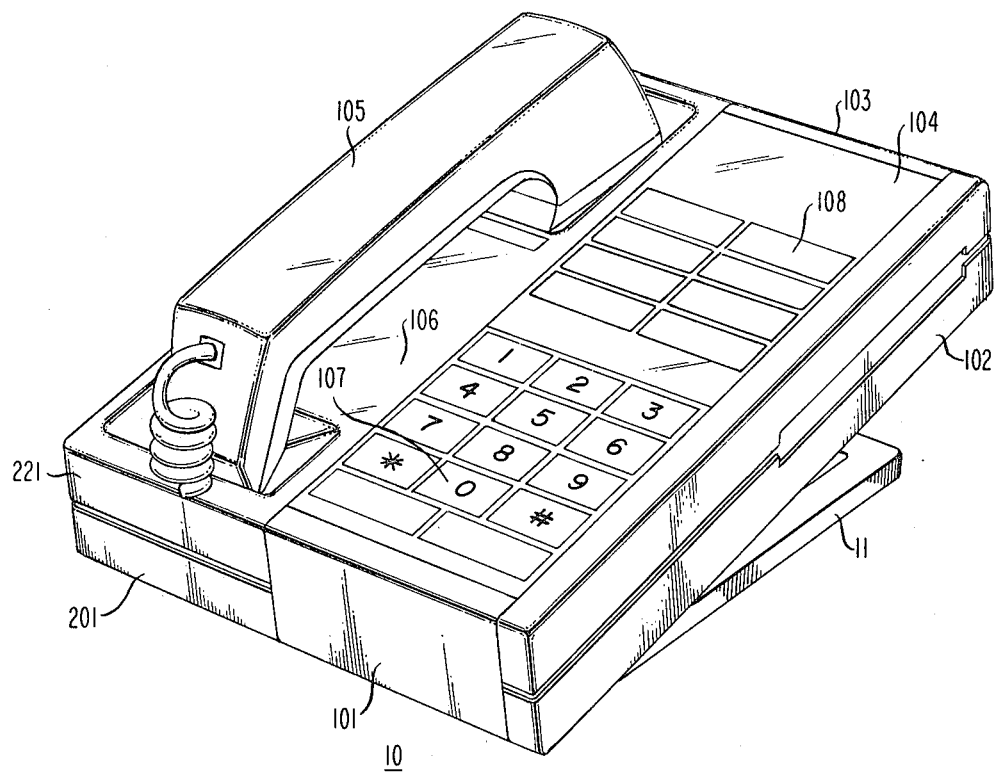
FIG. 1 is a perspective view of a telephone housing.

A communication housing 10 is shown in FIG. 1 having two main sections 106 and 104. Section 104 is a face plate for the housing which contains, for example, buttons 107 and lamps (or buttons) 108. The manner in which face plate 104 is secured to the basic housing by slides 101 and 103 is completely described in copending patent application of D. W. Tyler application Ser. No. 308,503, filed Oct. 5, 1981, which application is hereby incorporated by reference herein.

Section 106 is a cradle for supporting hand set 105 and, as shown, comprises lower section 201 and upper section 221, which sections are interlocked together in a clamshell manner which will be more fully described hereinafter. These sections cooperate to surround a basic housing (not shown in FIG. 1) to provide the design contours and color coordination of the housing.

Figure 2:
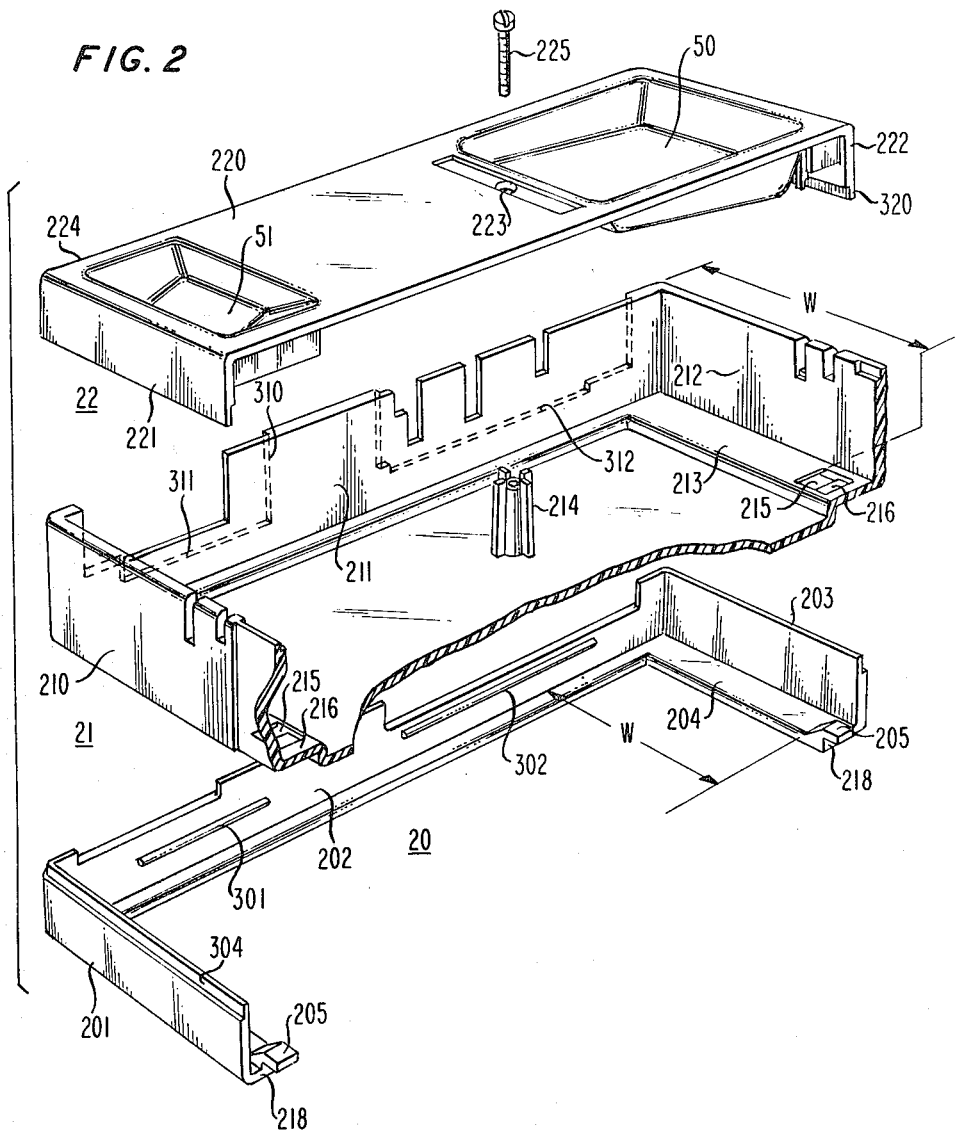
FIG. 2 is an exploded view of our clamshell arrangement.

The three main cooperative parts of our invention are shown in FIG. 2 where basic housing 21 is shown in conjunction with lower section 20 and upper section 22. Basic housing 21 can be any width or length desired. FIG. 2 shows only a section of the housing with the right hand section not shown but constructed, for example, as shown in the above-identified Tyler disclosure. For purposes of discussion, we will consider face 210 of housing 21 to be the left side face and face 212 to be the right side face and we will consider face 211 to be the front face.

On the inside of basic housing 21 there is a ledge which runs around the housing. This ledge is shown as 213 and extends circumferentially around the inside of the basic housing. At a position on the side ledges a width w from the inside of front face 211 spaced on both the right and left sides, there are holes 215 which, as will be seen, form hinging receptacles for mating tabs of the lower section 20.

On the front outside surface of face 211 there is shown two detents 311 and 312 which can be formed by removing some of the material from the outside surface of the front face of basic housing 21.

Mounting post 214 is contained within the housing 21 and is used, as will be seen to secure top section 22.

While housing 21 is shown devoid of any components, it is understood, of course, that the electronics and other mechanical apparatus which is necessary for the proper functioning of the telephone or other communicating device, would advantageously be located within the area bounded by the left, right and front faces of the basic housing. Also, if protection is desired for the components, the top, as well as the bottom, of housing 21, may be closed to all but authorized craftspeople.

Lower section 20 has left side 201, right side 203 and front face 202, all of which have ledge 304 designed into their outer top edges. On the inside front surface of section 202 of lower section 20 there is provided ledges 301 and 302 which ledges protrude inward, the purpose of which will be discussed hereinafter. A ledge 204 extends around the inner faces of sections 201, 202 and 203 and at the rearward edges of ledge 204, at a distance w from the inner side of face 202 tabs 205 are formed, which tabs are positioned upward and slightly behind trailing edges 218 of ledge 204. Of course, ledge 204 could be a continuous bottom plate having a width w and a length equal to the length of face 202. The outside surface of lower section 20 carries the desired color of the housing together with any design contours desired.

Upper section 22 has top surface 220 which surface has design contours 50 and 51 which, in the illustration, accept a telephone handset. Also in top surface 220 there is located hole 223 through which screw 225 can be inserted. As will be shown, screw 225 can be threaded into post 214 of basic housing 21 to securely lock the combined assembly. For design purposes, a name plate may be located over screw 225 to conceal the screw top from a casual viewer.

Upper section 22 has left side 221, right side 222 and front face 224, all of which have a groove or ledge 320 designed into their lower inside edges.

Figure 3:
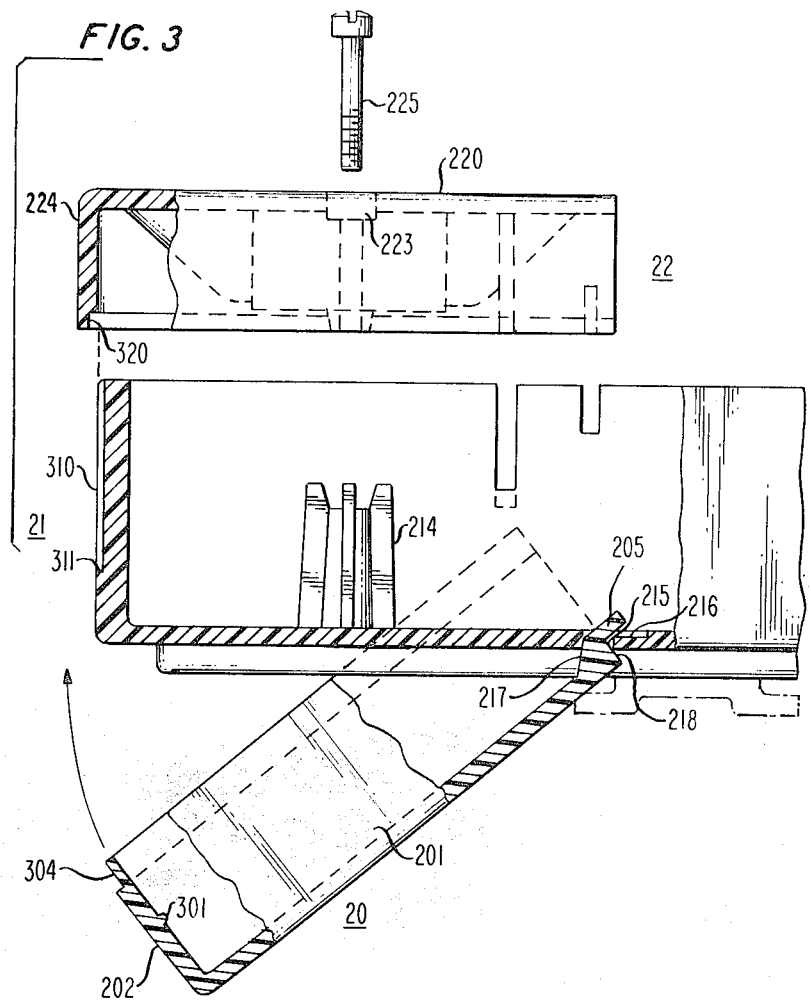
FIG. 3 is a partial assembly view of the parts showing how they fit together.

Turning to FIG. 3 for assembly purposes, tab 205 of lower section 20 is inserted through hole 215 of housing 21. The entire lower section 20 is then rotated upwards so that ledge 301 (and ledge 302 not shown) on the inner front surface of face 202 rests on top of detent 311 (312) on the front outer surface of basic housing 21.

When section 20 is rotated fully upward so that tab 301 rests on ledge 311, pressure may be removed from section 20 without section 20 separating from section 21. This cooperation is a result of the ramp action of 217 pushing the entire unit 20 backward (to the right) so that unless pressure away from face 21, i.e., to the left in FIG. 3, is exerted on section 20 it will remain in place on a semi-permanent basis.

Figure 4:
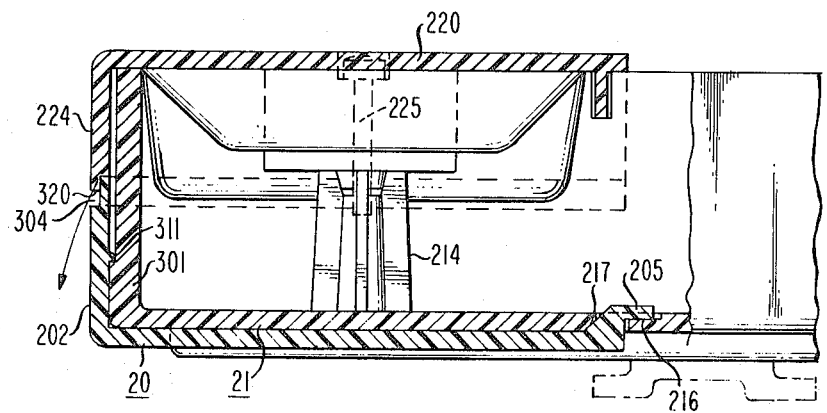
FIG. 4 is an assembly view of the parts cooperatively locked together.

At this point, upper section 22 is positioned over the combined lower assembly so that ledge 320 of face 224 fits outside of ledge 302 in the outer upper edge of lower section 20, as shown in FIG. 4. The overlapping occurs around the periphery of section 20. When upper section 22 is in position, screw 224 mates with post 214 thereby effectively locking the entire assembly. This locking occurs because the overlapping of sections 22 and 20 prevent lower section 20 from moving to the left. Since section 202 is not free to move to the left top, 301 remains locked with detent 311 preventing the downward rotation of section 20. Also, even without the detent, lower section 20 cannot now rotate downward because to do so would require that the upper edge of face 202 rotate outward due to the radius pivoting around tabs 205. This outward swing is prevented by the overlap of upper section 22. The entire assembly is thus securely interlocked easily and economically with a minimum of instructions and balancing required.

It will be noted that even without top section 22 in place, sections 20 and 21 are relatively firmly engaged by the simple motion of inserting tab 205 in slot 215 and rotating section 20 upward. Any person with any degree of dexterity who is capable of following very basic and simple directions can then disassemble and reassemble the telephone housing outer shell and may change the color bearing and design surfaces without in any way endangering or exposing the electronic components of the telephone set.

It should also be noted that if the lower section was a single plate then only one tab would be necessary to hinge into a single receptacle on the bottom of the housing base. Also, if it is desired to removably cover the open (right) side of basic housing 21, it would be possible to use two bottom sections 20, one turned in the opposite direction. In such a situation top 22 would have a lower extending face on its back (right) side.

What is claimed is:

1. A communication housing having a base, a lower section and an upper section,
    said upper and lower sections cooperating with each other to form a shell around at least a portion of said base,
    said lower section having at least one face and means projecting perpendicular to said one face, said projecting means adapted for rotatably mating with apertures in a bottom portion of said base thereby allowing said lower section to be rotated upward so that an inner surface of said lower section one face becomes positioned on the outside of a corresponding face of said base, said lower section including latch means located on the inner surface of said one face, said latch means adapted for mating with latch means located on said outside of said corresponding base face, said lower section latch means and said base latch means cooperating with each other when said lower section is rotated upward to inhibit said lower section from rotating downward without first being laterally separated from said base, and
    said upper section having at least one face adapted to fit over said base, said upper section face having means for engaging said one face of said lower section so that when said upper and lower sections are engaged with each other said lower section is prevented from being laterally separated from said base.

2. The invention set forth in claim 1 wherein said projecting means is a tab extending outward from a lower edge of said lower section.

3. The invention set forth in claim 2 wherein said lower section latch means is a tab and wherein said base latch means is a ledge.

4. An outer shell for a communication housing, said shell comprising upper and lower sections adapted to cover said housing on at least three sides and the top thereof, said housing having at least one receptacle in the bottom thereof,
    said lower section having a front surface and having left and right surfaces extending substantially parallel to each other and connected respectively to the left and right ends of said front surface, the outside of said surfaces being visible to a viewer when said two sections cover said housing, said surfaces having an indention along a top outside edge thereof, said lower section having tabs projecting from the unattached end of said left and right surfaces, said tabs adapted for cooperation with said housing receptacle so that said lower section may be rotated upward surrounding said housing with said left, right and front surfaces, said lower section further including a protrusion on the inner side of said front surface, said protrusion adapted for mating with a ledge on the outer surface of said housing such that when said lower section is rotated upward said protrusion and said ledge cooperate to prevent said lower section from rotating downward unless said lower section is moved laterally with respect to said housing, and said upper section having left, right, front and top surfaces, the outside of said surfaces being visible to a viewer when said two sections cover said housing, said left, right and front surfaces having an indention along a bottom inside edge thereof, said indention cooperating with said lower section indention when said upper section is positioned around said housing to prevent said lower section from moving away from said housing.

* * * * *